US008728312B2

(12) United States Patent
Chung et al.

(10) Patent No.: US 8,728,312 B2

(45) Date of Patent: May 20, 2014

(54) METHOD AND DEVICE FOR FILTERING BLOOD USING MAGNETIC FORCE

(75) Inventors: Kwang Hyo Chung, Daejeon (KR); Yo Han Choi, Daejeon (KR); Chang-Geun Ahn, Daejeon (KR); Gun Yong Sung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 101 days.

(21) Appl. No.: 13/285,236

(22) Filed: Oct. 31, 2011

(65) Prior Publication Data

US 2012/0138534 A1 Jun. 7, 2012

(30) Foreign Application Priority Data

Dec. 6, 2010 (KR) ........................ 10-2010-0123445

(51) Int. Cl.

*B03C 1/30* (2006.01)

*B01D 35/06* (2006.01)

(52) U.S. Cl.

USPC ........... 210/223; 210/695; 210/649; 210/295; 210/321.75; 422/535

(58) Field of Classification Search

USPC .............. 210/321.6, 644, 645, 649, 651, 695, 210/222, 223; 604/6.01, 6.04, 6.09; 422/177, 178, 287.7, 287.8, 534, 535; 436/177, 178

See application file for complete search history.

(56) References Cited

U.S. PATENT DOCUMENTS

| | | | | |
|---|---|---|---|---|
| 5,882,514 | A * | 3/1999 | Fletcher | 210/223 |
| 6,821,790 | B2 * | 11/2004 | Mahant et al. | 436/177 |
| 2007/0166192 | A1 * | 7/2007 | Ehben et al. | 422/58 |
| 2010/0322824 | A1 * | 12/2010 | Neijzen | 422/69 |

FOREIGN PATENT DOCUMENTS

| | | | |
|---|---|---|---|
| JP | 2004344874 | A | 12/2004 |
| KR | 1020090049414 | A | 5/2009 |
| KR | 1020090064935 | A | 6/2009 |
| WO | WO2009/060357 | * | 5/2009 |

OTHER PUBLICATIONS

M. Takayasu, D. R. Kclland, and J. V. Minervini; Continuous Magnetic Separation of Blood Components from Whole Blood, IEEE Transactions on APPLItD Supeiiconductivity, vol. 10, Mar. 2000, pp. 927-930.*

* cited by examiner

*Primary Examiner* — David C Mellon
*Assistant Examiner* — Pranav Patel

(57) ABSTRACT

Disclosed are a method and an apparatus for filtering plasma using magnetic force. The apparatus for filtering plasma using magnetic force includes: an inlet into which blood is injected; a filter unit filtering plasma in the blood passing through the inlet by capillary force; a magnetic force receiving part made of magnetizable materials and assisting plasma filtering by applying pressure to the filter unit by movement due to magnetic force generated from the outside; an outlet discharging plasma filtered from blood; and a filter outer body surrounding the inlet, the filter unit, the magnetic receiving part, and the outlet.

8 Claims, 3 Drawing Sheets

METHOD AND DEVICE FOR FILTERING BLOOD USING MAGNETIC FORCE

CROSS-REFERENCE TO RELATED APPLICATIONS

This application is based on and claims priority from Korean Patent Application No. 10-2010-0123445, filed on Dec. 6, 2010, with the Korean Intellectual Property Office, the present disclosure of which is incorporated herein in its entirety by reference.

TECHNICAL FIELD

The present disclosure relates to a device for filtering plasma from whole blood, and more particularly, to a method and a device for filtering blood using magnetic force capable of being attached to a biochip and being used as disposable.

BACKGROUND

Blood circulates through a blood vessel of a person or an animal and carries oxygen inhaled in the lungs to tissue cells and carries carbon dioxide from the tissue to the lungs to discharge it from the body. Further, the blood carries a nutriment absorbed in an alimentary canal to organs or tissue cells and carries degradation products from tissues, that is, materials unnecessary for a live body to a kidney to be discharged from the body, and carries hormones secreted from an endocrine gland to functional organs and tissues. Further, the blood performs various actions, such as equally distributing body heat to constantly maintain body temperature, destructing or detoxifying bacteria or foreign objects infiltrated in a live body, or the like.

The blood, which is a main index for determining various diseases or a health state, is an index to perform diagnoses and prognosis management for diseases associated with protein by measuring presence or absence of specific protein or an amount thereof using a blood analyzer. Recently, a biochip capable of easily and rapidly diagnosing and analyzing specific diseases by injecting a small amount of blood into a disposable chip in a strip type has been developed. The biochip may rapidly and inexpensively perform various blood tests and analyses requiring a long period of time without using professionals or special test equipment.

The blood consists of blood cells including leukocyte, erythrocyte, platelet, or the like, and plasma including water, protein, fat, sugar, and other minerals. The protein to be detected is mainly present in the plasma. In order to obtain high sensitive, reproducible results, the blood cells are removed from the blood by using the biochip and only the plasma component is used to measure and detect the protein. Therefore, a plasma filter element for effectively filtering only the plasma component in the blood is required as a kind of pre-processor of the biochip and is an important component for accuracy and precision of the biochip.

There are various methods for filtering plasma from whole blood in the related art. For example, there are a method for filtering blood cells and plasma using centrifugal force, a method for extracting plasma by filtering the blood cells from blood using a fine structure disposed in a channel, having a smaller size than the blood cells, a method for extracting only a plasma component from blood by installing a diaphragm having a low height so as to prevent blood cells from passing therethrough, a method for filtering blood cells by disposing paper, a glass fiber, a porous medium, a membrane, or the like, at a side or front in which blood flows, a method for extracting only plasma by forming layers of blood cells and plasma using a precipitation effect of blood cells due to gravity, and a method for deflecting a flow of blood cells by applying electrical signals to blood.

As described above, as requirements of the filter for separating plasma on the biochip, use of a small amount of sample blood, high blood cell removal efficiency, simple operation, non-dilution, speed, reproducibility, inexpensive disposable use, and compatibility, or the like, are needed.

However, the filter for filtering plasma according to the related art satisfies only some of these requirements or has only the characteristic functions and therefore, has a limitation in structural and functional aspects which do satisfy all the requirements.

SUMMARY

The present disclosure has been made in an effort to provide a method and a device for filtering plasma using magnetic force, including the use of a small amount of sample blood, high blood cell removal efficiency, simple operation, non-dilution, speed, reproducibility, inexpensive disposable use, and compatibility.

An exemplary embodiment of the present disclosure provides an apparatus for filtering plasma using magnetic force, including: an inlet into which blood is injected; a filter unit filtering plasma in the blood passing through the inlet by capillary force; a magnetic force receiving part made of magnetizable materials and assisting plasma filtering by applying pressure to the filter unit by movement due to magnetic force generated from the outside; an outlet discharging plasma filtered from blood; and a filter outer body surrounding the inlet, the filter unit, the magnetic force receiving part, and the outlet.

Another exemplary embodiment of the present invention provides a method for filtering plasma using magnetic force, including: filtering plasma from blood by capillary force of a filter; and storing the filtered plasma in a biochip by moving the filtered plasma, wherein the filtering of the plasma assists plasma filtering by applying pressure to the filter by magnetic force generated from the outside.

As set forth above, the exemplary embodiment of the present disclosure can provide the method and the apparatus for filtering plasma using the membrane filter and the magnetic force, thereby increasing the blood cells removal efficiency while using a small amount of blood so as to filter plasma.

The exemplary embodiment of the present disclosure can filter the plasma by injecting a small amount of blood into the filter and mounting it in the maternal part, thereby making the operation simple.

The exemplary embodiment of the present disclosure can use the whole blood as it is without requiring the dilution, thereby improving the sensitivity and reproducibility of the protein detection results The exemplary embodiment of the present disclosure can manufacture the apparatus for filtering plasma in an integrated type by using the inexpensive plastic material, such that the apparatus can be used as disposable and can be mass produced.

The exemplary embodiment of the present disclosure can easily remove the apparatus for filtering plasma to be attached to all the types of bio chips and can be manufactured in a module type, thereby increasing the compatibility.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings.

Figure 1:
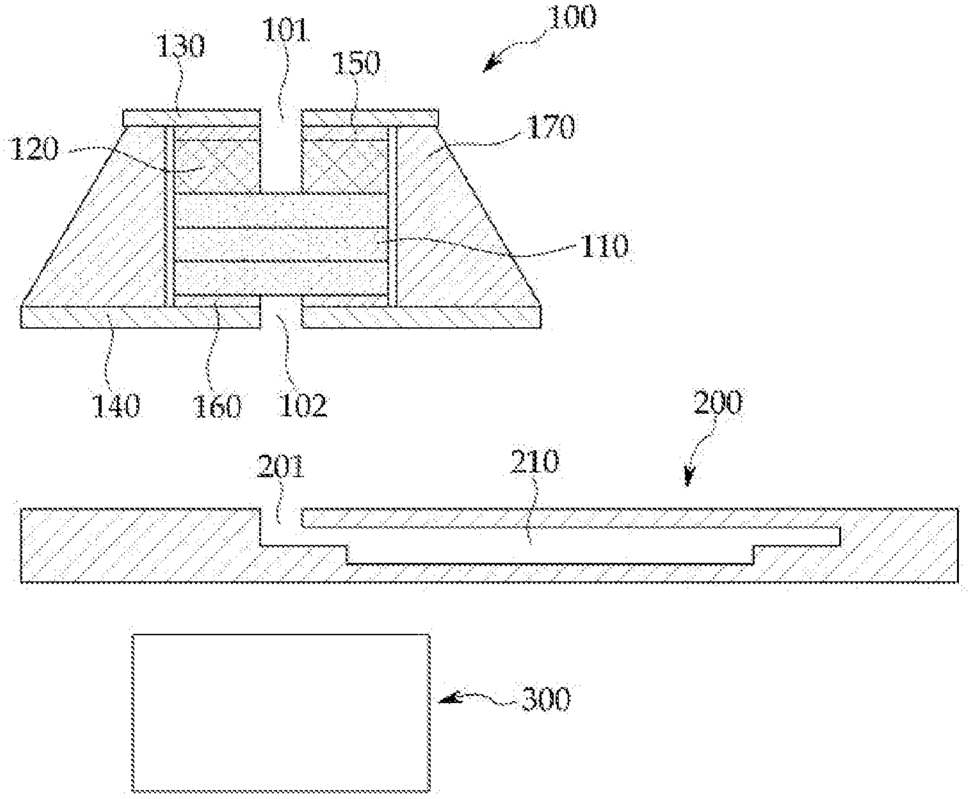
FIG. 1 is a cross-sectional view for explaining structures of an apparatus for filtering plasma, a bio chip, and an apparatus for generating magnetic force according to an exemplary embodiment of the present disclosure.
Figure 2:
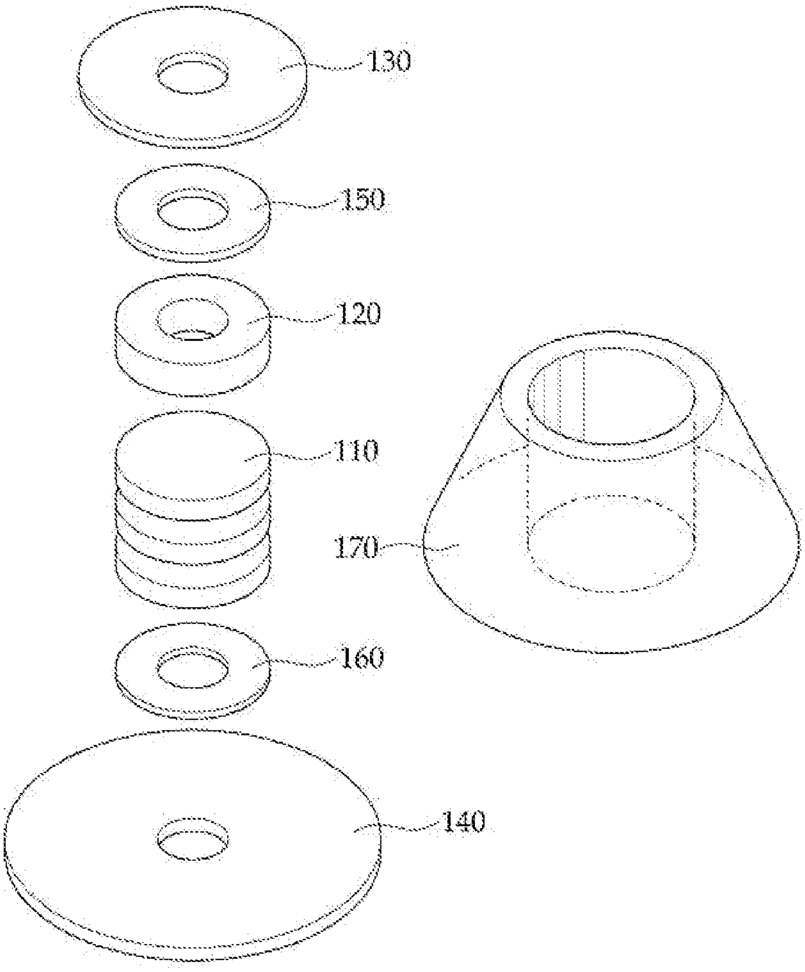
FIG. 2 is an exploded perspective view for explaining an internal structure of the apparatus for filtering plasma of FIG. 1.

FIG. 1 is a cross-sectional view for explaining a structure of an apparatus for filtering plasma, a bio chip, and an apparatus for generating magnetic force according to an exemplary embodiment of the present disclosure and FIG. 2 is an exploded perspective view for explaining an internal structure of the apparatus for filtering plasma of FIG. 1.

As shown in FIG. 1, an apparatus 100 for filtering plasma according to an exemplary embodiment of the present disclosure can be removed from a biochip 200 and has an apparatus 300 for generating magnetic force mounted at the outside thereof.

An outlet 102 of apparatus 100 for filtering plasma is mounted to match an inlet 201 of biochip 200 and serves as a path through which plasma from the apparatus 100 for filtering plasma flows in biochip 200.

In order to couple apparatus 100 for filtering plasma with biochip 200, a lower fixing part 140 is mounted on a bottom surface of apparatus 100 for filtering plasma. Apparatus 300 for generating magnetic force applies magnetic force to a magnetic force receiving part 120 of apparatus 100 for filtering plasma to move magnetic force receiving part 120 to outlet 102

As shown in FIG. 1 or FIG. 2, apparatus 100 for filtering plasma has an upper elastic plate 150, magnetic force receiving part 120, a membrane filter 110, and a lower elastic plate 160 that are stacked in an inner circular space of a filter outer body 170, each of which is fixed by an upper fixing part 130 and a lower fixing part 140.

Hereinafter, a process for filtering plasma of apparatus 100 for filtering plasma according to the exemplary embodiment of the present disclosure will be described in detail.

First, blood is injected into inlet 101 of apparatus 100 for filtering plasma and passes through magnetic force receiving part 120 and membrane filter 110 by capillary force, gravity, or the like, to be moved to outlet 102. In this case, blood cells in blood are adsorbed into membrane filter 110 to be removed, thereby passing only the plasma component.

Further, the plasma moved to outlet 102, that is, an inlet 201 of biochip 200 continuously moves to a plasma storing chamber 210 of the bio chip 200 by the capillary force. In this case, in order to control a moving speed of plasma, the plasma included in the membrane filter 110 moves to biochip 200 while being squeezed due to attraction applied to magnetic force receiving part 120 using an apparatus 300 for generating magnetic force. In this case, magnetic force generated from apparatus 300 for generating magnetic force may maintain a predetermined magnitude even in the case in which predetermined time elapses after the blood is injected and may be a sine wave type or a square wave type having a predetermined period and serves to periodically squeeze the plasma in membrane filter 110.

As described above, the magnetic force from apparatus 300 for generating magnetic force is applied by the capillary force of membrane filter 110, thereby improving plasma filtering efficiency.

Meanwhile, the coupling of an apparatus 100 for filtering plasma and biochip 200 may be made before blood is injected or after blood is injected.

Hereinafter, a function of each component configuring apparatus 100 for filtering plasma will be described in detail.

Membrane filter 110 may be made of paper, a glass fiber, and a porous vehicle and may be a plurality of layers so as to improve the plasma filtering efficiency and control a filtered amount of plasma. In this case, in order to manufacture a predetermined type of stacked filter, a sheet type of filter may be manufactured by punching. Further, various bio materials, chemicals, or the like, may be applied to membrane filter 110 so as to perform previous reaction required in biochip 200.

Figure 3:
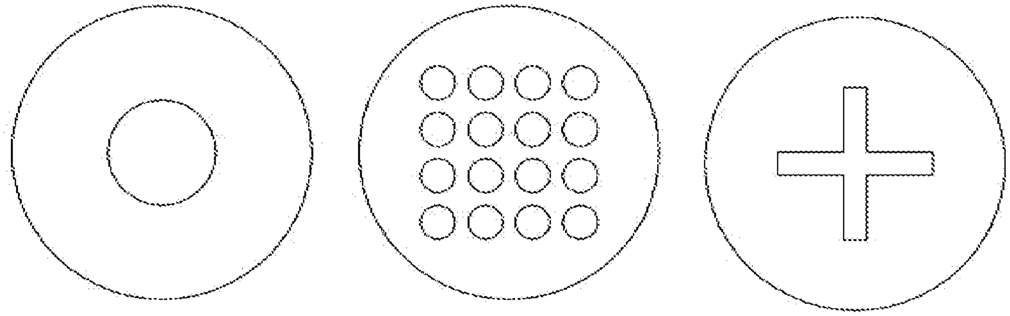
FIG. 3 is a diagram showing various punching shapes of a magnetic force receiving unit according to an exemplary embodiment of the present invention.

Magnetic force receiving part 120 is made of magnetizable materials so as to generate magnetic force having a predetermined magnitude by apparatus 300 for generating magnetic force. In particular, magnetic force receiving part 120 may be made of magnet, iron, or the like. A central portion of magnetic force receiving part 120 may be punched so as to smoothly move blood. FIG. 3 is a diagram showing a punched shape of magnetic force receiving part 120. The punched shape of magnetic receive part 120 may be a circular shape, a polygonal shape, a cross shape, or the like.

In addition, magnetic force receiving part 120 moves in a direction of membrane filter 110 due to attraction of magnetic force generated by apparatus 300 for generating magnetic force. Membrane filter 110 may be displaced due to the movement of magnetic force receiving part 120 and plasma filtering may be accelerated by applying additional pressure to the capillary force generated in membrane filter 110.

Further, an example of variables of the plasma filtering performance may include a magnitude in magnetic force. The magnitude in magnetic force may be changed by performance of apparatus 300 for generating magnetic force, a material, a shape, a size and a thickness of magnetic receiving part 120, or the like.

In addition, in the exemplary embodiment of the present disclosure, a lubricant may be applied to magnetic force receiving part 120 or an inner space of filter outer body 170 so as to smoothly move magnetic force receiving part 120 in the inner space of filter outer body 170.

Apparatus 300 for generating magnetic force may be closely disposed to a bottom end of the biochip 200. Apparatus 300 for generating magnetic force may be formed of a permanent magnet or an electromagnet and a magnitude in magnetic force may be controlled to match the magnitude and position of magnetic force receiving part 120. In this case, when an apparatus 300 for generating magnetic force is an electromagnet, it may control the magnitude in magnetic force by an on/off control of magnetic force, a control of magnetic force according to a time function type, and a control of magnetic force by current control and may perform an additional function for plasma flow. When apparatus 300 for generating magnetic force is a permanent magnet, it selects the magnitude in magnetic force of the permanent magnet to select magnetic force affecting magnetic force receiving part 120 and increase the plasma flow.

Upper elastic plate 150 has an O-ring type of which the central portion is empty and is attached to upper fixing part 130. Upper elastic plate 150 prevents magnetic receiving part 120 from being coupled with upper fixing part 130 when magnetic force receiving part 120 moves by the magnetic force of apparatus 300 for generating magnetic force.

Lower elastic plate 160 is has an O-ring type of which the central portion is empty and is closely disposed between membrane filter 110 and lower fixing part 140 and serves to prevent blood cells from being unnecessarily leaked to outlet 102 due to the space between membrane filter 110 and filter outer body 170 during the process for filtering plasma.

As upper elastic plate 150 and lower elastic plate 160, various rubber plates, poly dimethyl siloxane (PDMS), and silicon rubber, or the like, may be used.

Upper fixing part 130 confines components stacked in filter outer body 170 in the circular space. The inside of upper fixing part 130 is formed with holes and is manufactured by a single sided tape to be attached to filter outer body 170, upper elastic plate 150, or the like.

Lower fixing part 140 is disposed at the bottom surface of apparatus 100 for filtering plasma so as to couple the apparatus for filtering plasma with the biochip and may be formed by a double sided tape of various materials or other sealing members having adhesion. If the size of outlet 102 of apparatus 100 for filtering plasma may appropriately match the size of inlet 201 of biochip 200 regardless of the size and material of biochip 200, apparatus 100 for filtering plasma may be fixed by lower fixing part 140 to be used for all types of biochips regardless of the types of biochip 200.

Filter outer body 170 is to stack other components of apparatus 100 for filtering plasma and may be manufactured in various shapes and materials for convenience and may be plastic injection molded to be mass produced at low cost.

Further, the inner space of filter outer body 170 may accommodate blood of 10 μl to 100 μl and if the inner may be stacked with other components, the inner space may be in various shapes in addition to a circular punching.

In addition, the inner space of filter outer body 170 may be formed larger than the size of magnetic force receiving part 120 so as to smoothly move magnetic force receiving part 120.

Figure 4:
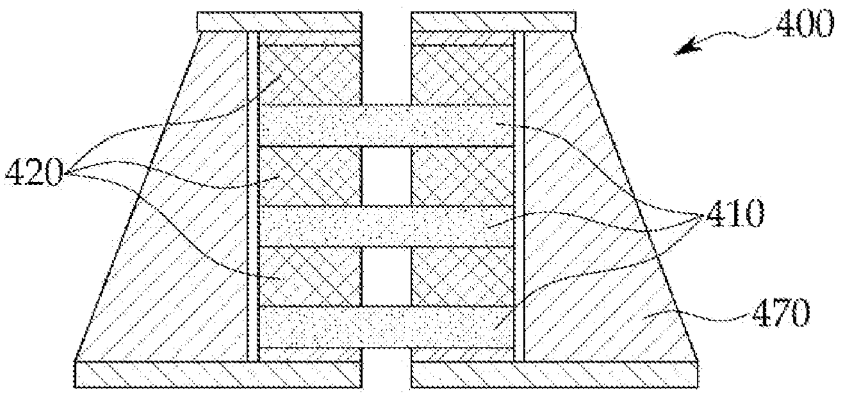
FIG. 4 is a cross-sectional view for explaining a structure of an apparatus for filtering plasma according to another exemplary embodiment of the present disclosure.
Figure 5:
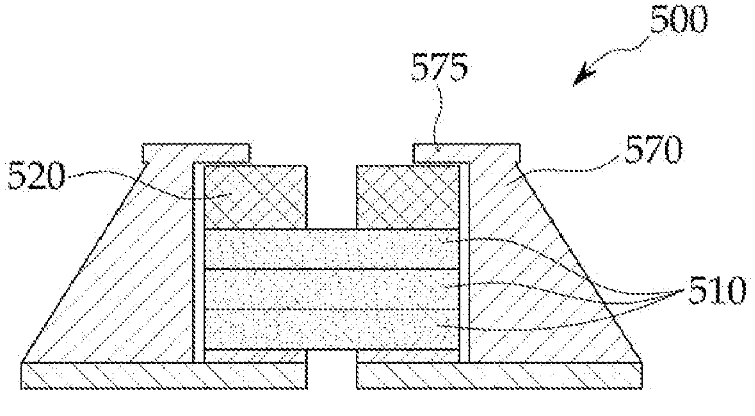
FIG. 5 is a cross-sectional view for explaining a structure of an apparatus for filtering plasma according to yet another exemplary embodiment of the present disclosure.

FIG. 4 is a cross-sectional view for explaining a structure of an apparatus for filtering plasma according to another exemplary embodiment of the present disclosure and FIG. 5 is a cross-sectional view for explaining a structure of an apparatus for filtering plasma according to yet another exemplary embodiment of the present disclosure.

The shape of filter outer body 170 and other components of apparatuses 400 and 500 for filtering plasma may be stacked and disposed in various shapes as shown in FIGS. 4 and 5 so as to improve the plasma filtering efficiency. In particular, FIG. 4 shows a shape in which three magnetic force receiving parts 420 and three membrane filters 410 are stacked to intersect with each other. As such, the necessary number of magnetic receiving parts 420 and the membrane filters 410 may be stacked to intersect with each other according to the usage of biochip 200, the necessary amount of plasma, the precision of plasma filtering, the plasma filtering time and efficiency, or the like.

Apparatus for filtering plasma of FIG. 5 includes a fixing part 575 instead of upper fixing part 130 and upper elastic part 150 without configuring upper fixing part 130 and upper elastic plate 150 of FIG. 1 as separate parts, wherein fixing part 575 is integrated with filter outer body 570.

As described above, another exemplary embodiment of the present disclosure integrates the functions of parts, thereby improving the costs of products and the durability of parts.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for filtering plasma using magnetic force, comprising:

an inlet located at a top of the apparatus into which blood is injected;

a filter unit filtering plasma in the blood passing through the inlet by capillary force;

a magnetic force receiving part made of magnetizable materials disposed on top of and in contact with the filter unit, wherein the magnetic force receiving part is configured to apply pressure to the filter unit through downward movement due to attraction to a magnetic force generated from a magnetic force apparatus located underneath the apparatus;

an outlet located at the bottom of the apparatus discharging plasma filtered from the blood; and a filter outer body surrounding the inlet, the filter unit, the magnetic receiving part, and the outlet; and wherein the blood outlet is aligned above an inlent of a biochip.

2. The apparatus of claim 1, wherein the filter unit is configured in a plurality of layers.

3. The apparatus of claim 2, wherein the filter unit is a membrane filter.

4. The apparatus of claim 3, wherein a bio material or a chemical is applied to the membrane filter.

5. The apparatus of claim 1, wherein the inlet, the magnetic receiving part, and the outlet each has a through hole through which blood or plasma flows.

6. The apparatus of claim 5, wherein the through hole is any one of a circular shape, a cross shape, and a polygonal shape, each of which is formed one or in plural.

7. The apparatus of claim 1, wherein the magnetic force apparatus is mounted below the biochip.

8. The apparatus of claim 1, wherein the filter outer body is plastic injection molded.

* * * * *